United States Patent

[11] 3,590,371

[72] Inventor Hugh E. Shaw, Jr.
 New Kensington, Pa.
[21] Appl. No. 889,486
[22] Filed Dec. 31, 1969
[45] Patented June 29, 1971
[73] Assignee PPG Industries, Inc.
 Pittsburgh, Pa.
 Continuation-in-part of application Ser. No. 795,454, Jan. 31, 1969, now abandoned.

[54] METHOD UTILIZING THE COLOR CHANGE WITH TEMPERATURE OF A MATERIAL FOR DETECTING DISCONTINUITIES IN A CONDUCTOR MEMBER EMBEDDED WITHIN A WINDSHIELD
3 Claims, 1 Drawing Fig.

[52] U.S. Cl. ................................................. 324/51,
 73/356, 340/256
[51] Int. Cl. ....................................... G01r 31/02,
 G01k 11/12
[50] Field of Search ........................................... 324/51, 66;
 73/356; 340/256, 228

[56] References Cited
UNITED STATES PATENTS

| 2,642,481 | 6/1953 | Wilson | 324/66 X |
| 2,673,325 | 3/1954 | Orr | 324/32 |
| 2,710,274 | 6/1955 | Kuehl | 73/356 X |
| 2,945,305 | 7/1960 | Strickler | 73/356 X |
| 3,114,836 | 12/1963 | Fergason et al. | 73/356 UX |
| 3,396,335 | 8/1968 | Burr et al. | 324/51 |
| 3,501,698 | 3/1970 | Becknell | 324/51 |

OTHER REFERENCES
Fergason; James L., " Liquid Crystals," SCIENTIFIC AMERICA Aug., 1964 pp. 77— 82 & 85

Primary Examiner—Gerard R. Strecker
Attorney—Chisholm and Spencer

ABSTRACT: Circuit discontinuities in conductor members embedded in pieces of glass, such as windshields, are detected by placing in operative association with the glass a stratum of cholesteric-phase liquid-crystal material having appropriate color-change temperature-range characteristics. When current is passed through the conductors, color changes are observed in the vicinities of the operating conductors. By using for the cholesteric-phase liquid-crystal material a mixture of at least first and second ingredients, with the first and second ingredients spanning respectively different portions of the temperature range from about 20° C. to about 32° C., desirable and useful indications are rapidly obtained without the use of particular testing-environment conditions or particular glass-storage conditions.

PATENTED JUN29 1971

3,590,371

INVENTOR
HUGH E. SHAW JR.

BY Chisholm and Spencer

ATTORNEYS

METHOD UTILIZING THE COLOR CHANGE WITH TEMPERATURE OF A MATERIAL FOR DETECTING DISCONTINUITIES IN A CONDUCTOR MEMBER EMBEDDED WITHIN A WINDSHIELD

CROSS REFERENCE TO RELATED APPLICATION

This application is a continuation-in-part of my copending application Ser. No. 795,454, filed Jan. 31, 1969, and now abandoned.

BACKGROUND OF THE INVENTION

1. Field of the Invention

This invention relates to a method of detecting circuit discontinuities in conductor members supported by a windshield or similar substrate.

2. Description of the Prior Art

It is known that it is possible to make windshields or backlights for automobiles or aircraft that are of such nature as to have embedded in them a plurality of very fine conductor members, these being of copper or the like. The conductor members are of such number, size, spacing and shape as not to interfere with the transmission of light though the window and at the same time are such that by the application of heat to suitable bus bars or the like at their end, it is possible to pass current through them and thereby heat the windshield or backlight for defogging or deicing purposes. Various methods are known for making windshields of this type. In accordance with one of these methods, the conductor members are made by an electroless immersion process, that is, by dipping into a suitably prepared plating bath a plate of glass that has had deposited thereon, for example by vapor deposition and photographic etching techniques, a suitable pattern of a metal more electropositive than copper. Particularly when a heated windshield or backlight member is repaired in this way, it is likely there will be one or more breaks in the intended circuit pattern. Prior to the instant invention, however, the detection of such breaks was an exceedingly difficult and time-consuming task, usually involving optical inspection of the piece of glass through a microscope or the like.

In the field of organic chemistry, it has been known to produce cholesteric-phase liquid-crystal materials. In this regard, reference is made to U.S. Pat. No. 3,114,836; British Pat. No. 1,138,590; and the article by G. H. Brown and W. G. Shaw in Chemical Reviews, Volume 57, No. 6, Dec. 1957, page 1049, entitled "The Mesomorphic State—Liquid Crystals." Although it is ordinarily considered that crystals occur in matter in the solid state, it has been observed that in certain organic chemical compounds based upon cholesterol and the like and the mixtures thereof, while said compounds are within a certain temperature range, crystals develop. This happens despite the fact that these organic compounds or mixtures thereof are in a state of molecular arrangement such that a physicist examining the molecules thereof would classify them as "liquids." It is known, moreover, that these substances that exhibit such crystals have the property, in a certain portion of the temperature range in which the cholesteric-phase liquid crystals exist, of operating upon light transmitted though them or reflected from them in such a way as to show different colors of the visible spectrum, and that this color display is temperature-dependent, being (for example) red at 20° C. and violet at 25° C., with the other colors of the spectrum occurring in between. The absolute temperature at which such a color change takes place depends upon the material involved, as does the width of the color-display temperature range. In some instances the range is quite broad, such as 1° C. to 100° C., and in other instances it is quite narrow, spanning only 5° C. or less. Those skilled in the art of making and working with cholesteric-phase liquid-crystal compositions are familiar with the practice of selecting one or more suitable derivatives of cholesterol, mixing these with a suitable solvent or vehicle such as chloroform or hexane, and pouring the mixture onto a sheet or plate to cause the solvent to evaporate, leaving a film of the desired cholesteric-phase liquid-crystal material. It is also known that such cholesteric-phase liquid-crystal materials can be microencapsulated (see the above-mentioned British Pat. No. 1,138,590).

The prior art does not, to my knowledge, contain any suggestion of the use of a film of a cholesteric-phase liquid-crystal material for the purpose of detecting circuit discontinuities in windshields, backlights, etc., and the like.

In the development of the invention in its preferred aspects, difficulties were encountered. In particular, there was sometimes encountered the problem that the testing environment was at a temperature above color-display temperature range of the cholesteric-phase liquid-crystal material being used, and in that event, the application of electrical power to the bus bars of the windshield or backlight did not yield any temperature display indicative of circuit discontinuities. Moreover, if the testing environment was substantially below the color-change temperature range of the liquid-crystal material, it was sometimes necessary to wait a considerable length of time and/or to apply relatively high power to the windshield or backlight in order to cause sufficient warming of the windshield or backlight to yield an appropriate temperature display. Previous storage of the pieces to be tested at a low temperature, such as might be encountered in an unheated warehouse, sometimes caused the same effect.

SUMMARY OF THE INVENTION

In accordance with the invention, circuit discontinuities in a conductor-heated windshield, backlight, or similar substrate are detected by bringing into operative association with the substrate a stratum of cholesteric-phase liquid-crystal material having an appropriate color-change temperature range, applying electrical current to the conductors to cause them to become heated, and observing the changes that take place in the stratum of liquid-crystal material. In particular, difficulties concerned with changes in the temperature environment of the testing and with the previous storage conditions to which the substrate to be tested have been subjected are overcome by using for the cholesteric-phase liquid-crystal material a mixture of at least a first ingredient and a second ingredient, with the first ingredient having a color-change temperature range that spans one portion of the temperature range between 20° C. and 32° C. and with the second ingredient having a color-change temperature range that spans a different part of the above-mentioned temperature range of 20° C. to 32° C.

DESCRIPTION OF THE DRAWING a complete understanding of the invention may be obtained from the foregoing and following description thereof, taken together with the appended drawing, in which:

FIG. 1 illustrates the use of a test member in accordance with the invention in conjunction of the substrate to be tested; and FIG. 2 is a view taken on the line II–II of FIG. 1.

DESCRIPTION OF THE PREFERRED EMBODIMENT

Figure 1:
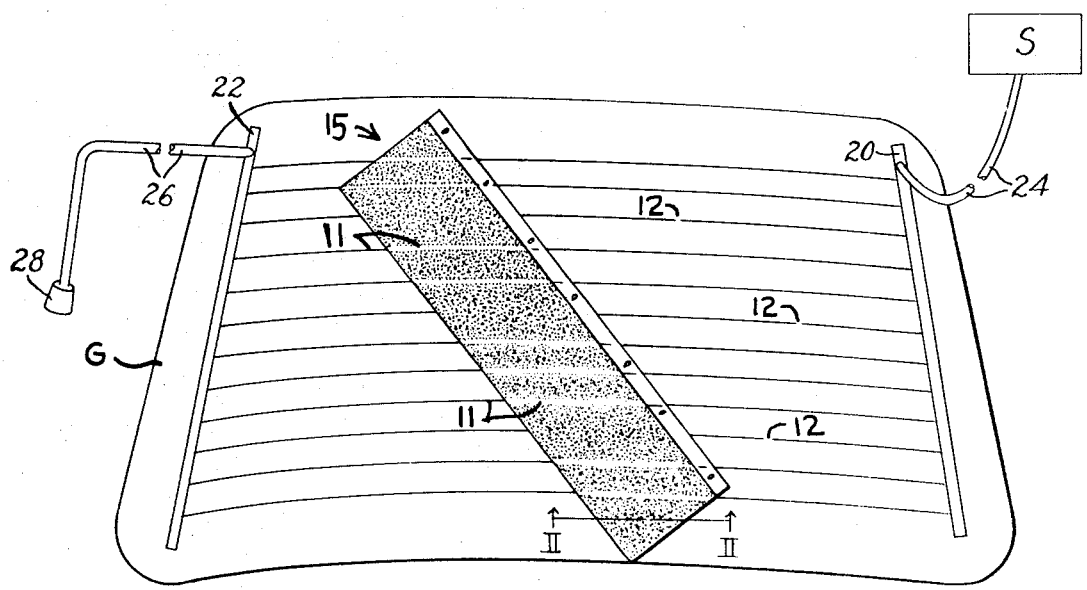
Figure 2:
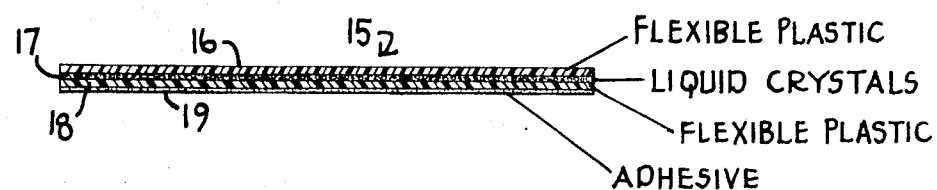

Referring to the drawing, there is shown a substrate piece of glass or the like, the piece G having embedded therein a plurality of conductor members 11, some of which contain breaks as indicated at 12.

Positioned on the glass is a device 15 that comprises a layer of suitable cholesteric-phase liquid-crystal material 17 sandwiched between a stratum 16 of flexible plastic and a second stratum 18 of flexible plastic. To secure the piece 15 to the piece G, there may also be provided a strip 19 of double-faced adhesive material. The strata 16 and 18 may be made, for example, of polyethylene terephthalate or other suitable transparent material.

The stratum 17 of cholesteric-phase liquid-crystal material may comprise, for example, a mixture of (in weight per cent) 45 percent cholesteryl nonanoate, 50 percent cholesteryl linolineate and 5 percent cholesteryl chloride. If this particular liquidecrystal material is used, it has a color-change temperature of about 1° to about 100° C. This implies that it is necessary that the piece G and the testing environment be at about 0° C. or lower when the testing is commenced. As is indicated in FIG. 1, when electrical power is provided to the conductors 11 by means, for example, of suitable bus bars such as 20 and 22, the ones of the conductors 11 that contain the discontinuities or breaks 12 do not become warm, and consequently the portions of the test piece 15 that overlie them do not exhibit a color change, whereas the ones of the conductors 11 that overlie operative ones of the conductors 11 do.

Although power may be applied to conductors 11 by any of a plurality of well known means, FIG. 1 illustrates one suitable arrangement for supplying power to the conductors. A lead-in wire 24 is connected at one end to bus bar 20 and at the other end to any suitable current source S such as an alternator coupled to a battery of an automobile. A similar lead-in wire 26 having a ground connection terminal 28 is similarly attached to bus bar 22.

The testing may proceed merely to the point of determining whether the number of conductors 11 that are operating is great enough to provide adequate performance, or if desired, the fact that a given one of the conductors 11 has remained cold can be used as a basis for further search of that particular conductor, with a view to repairing the break or discontinuity when it is found. In this connection, it is noteworthy that the invention is not to be considered as being specifically limited to the testing of windshields after they have been assembled. Invention will also be of use in inspecting, for example, panels of glass having a conductor pattern on one side of them, these panels being intended for subsequent inclusion in a windshield or the like of the kind indicated above.

Those skilled in the art of making and using cholesteric-phase liquid-crystal compositions will have no difficulty in selecting compositions of this kind that operate more satisfactorily than the particular one indicated above.

For example, there is a composition that consists of 20 weight percent cholesteryl propionate and 80 weight percent of cholesteryl oleate, which exhibits a color-change temperature range of about 25° C. to about 30° C. If this composition were to be used in place of the one indicated above, it would be essential that the testing be conducted in an environment that is at a temperature of less than 25° C. Moreover, particularly in instances where the testing environment or the glass piece to be tested is at a temperature of substantially below 25° C., it sometimes happens that the time required for the development of a sufficient heating effect in the glass G to cause the appearance of the color change is undesirably long, such as a few minutes. This difficulty may be overcome by using instead, for example, a composition consisting substantially of 70 weight percent of cholesteryl myristate and 30 weight percent of cholesteryl butyrate. This mixture has a color-change temperature range about 20° to 25° C. Of course, with this mixture alone, care must be taken that neither the piece G nor the testing environment is at a temperature greater than 25° C., since otherwise the color change that is indicative of the discontinuities will not be observed.

It is true, in general, that most of the cholesteric-phase liquid-crystal materials that exhibit a desirably sharp color change do not have a temperature range much larger than about 5° C., and this causes it to be necessary either to provide careful control of the pretesting storage temperature of the pieces G and/or the temperature of the testing environment, or to adopt the expedient herein taught, namely, that of using either a suitable mixture of ingredients, such as 1:1 mixture of the propionate-oleate composition mentioned above with the butyrate-myristate composition mentioned above. Alternatively, the stratum 17 may comprise a series of strips, each strip being made of a cholesteric-phase liquid-crystal material that responds to a different temperature range.

I find that it is most convenient to use a mixture of two or three suitable ingredients, with each of those ingredients being a compound or a mixture that responds in a different portion of the temperature that extends from about 20° C. to about 32° C. This usually makes it possible to obtain adequate indication, despite the lack of any exercise of control over the testing-environment temperature or the pretesting storage temperature of the pieces G.

I claim as my invention:

1. A method of detecting discontinuities in at least one electric-circuit conductor member embedded within a sheet of glass that comprises:
   sandwiching a stratum of cholesteric-phase liquid-crystal material, said material having a color-change temperature range above the temperature of the environment of testing, between two strata of flexible and substantially transparent material to form a sandwich,
   bringing the sandwich so formed into operative association with said sheet of glass while said sandwich overlies said at least one conductor member,
   applying electrical current to said at least one conductor member to cause a color change in the liquid-crystal material adjacent any continuous at least one conductor member and
   observing said liquid-crystal material to detect any lack of color change adjacent to said at least one conductor member which indicates a discontinuity.

2. A method as defined in claim 1, characterized in that said liquid-crystal material has a color-change temperature range at temperatures between about 20° C. and 32° C.

3. A method as defined in claim 1, characterized in that cholesteric-phase liquid-crystal material comprises a mixture of a first ingredient and a second ingredient, said first ingredient having a color-change temperature range in the lower portion of the temperature range of from 20° to 32° C., and in that said second ingredient comprises a cholesteric-phase liquid-crystal material having a color-change temperature range in the upper portion of the temperature range extending from about 20° C. to about 32° C.